US010354123B2

(12) United States Patent
Owen

(10) Patent No.: US 10,354,123 B2
(45) Date of Patent: Jul. 16, 2019

(54) SYSTEM AND METHOD FOR DETERMINING THE AGE OF AN INDIVIDUAL

(71) Applicant: Innovative Technology Limited, Oldham (GB)

(72) Inventor: Gareth Owen, Oldham (GB)

(73) Assignee: Innovative Technology Limited, Oldham (GB)

( * ) Notice: Subject to any disclaimer, the term of this patent is extended or adjusted under 35 U.S.C. 154(b) by 68 days.

(21) Appl. No.: 15/628,756

(22) Filed: Jun. 21, 2017

(65) Prior Publication Data

US 2017/0372128 A1 Dec. 28, 2017

(30) Foreign Application Priority Data

Jun. 27, 2016 (GB) .................................... 1611119.7

(51) Int. Cl.
  *G06K 9/00* (2006.01)
  *G06K 9/46* (2006.01)
(52) U.S. Cl.
  CPC ..... *G06K 9/00248* (2013.01); *G06K 9/00275* (2013.01); *G06K 9/00281* (2013.01); *G06K 9/00288* (2013.01); *G06K 9/4642* (2013.01); *G06K 9/00* (2013.01); *G06K 2009/00322* (2013.01)
(58) Field of Classification Search
  None
  See application file for complete search history.

(56) References Cited

U.S. PATENT DOCUMENTS

| | | | |
|---|---|---|---|
| 6,016,148 A * | 1/2000 | Kang | G06T 15/04 345/622 |
| 2004/0153421 A1 | 8/2004 | Robinson | |
| 2007/0009167 A1* | 1/2007 | Dance | G06T 5/40 382/254 |
| 2007/0098235 A1 | 5/2007 | Halavee et al. | |
| 2009/0230185 A1 | 9/2009 | Benschop et al. | |
| 2012/0140982 A1* | 6/2012 | Sukegawa | G06K 9/00221 382/103 |
| 2012/0306874 A1* | 12/2012 | Nguyen | G06K 9/00208 345/420 |
| 2013/0136323 A1* | 5/2013 | Asiyanbola | A61B 6/12 382/128 |
| 2013/0223694 A1* | 8/2013 | Ricanek, Jr. | G06K 9/00221 382/118 |
| 2014/0004834 A1* | 1/2014 | Mian | G06F 3/017 455/414.1 |
| 2014/0247992 A1* | 9/2014 | Lin | G06K 9/6202 382/195 |

(Continued)

*Primary Examiner* — Kevin Ky

(74) *Attorney, Agent, or Firm* — Woodward Emhardt Henry Reeves & Wagner, LLP

(57) ABSTRACT

An imaging system comprising: a pair of cameras (2, 3) adapted to capture images in the near infrared region of the electromagnetic spectrum; a camera (4) adapted to capture images in the visible region of the electromagnetic spectrum; a near-infrared light source (5); and a controller (6). The system configured to obtain a plurality images of the face of an individual and, from a local binary pattern distribution of image pixels, determine the age of the individual in each of the images by applying a linear regression technique and computing an average.

18 Claims, 6 Drawing Sheets

(56) References Cited

U.S. PATENT DOCUMENTS

| | | | |
|---|---|---|---|
| 2014/0368601 A1* | 12/2014 | deCharms | H04W 4/021 348/14.02 |
| 2015/0086087 A1* | 3/2015 | Ricanek, Jr. | G06K 9/00221 382/118 |
| 2015/0199702 A1 | 7/2015 | Singh | |
| 2015/0332087 A1* | 11/2015 | Joshi | G06K 9/00 382/203 |
| 2015/0366328 A1* | 12/2015 | Tamura | A45D 44/00 434/100 |
| 2016/0055368 A1* | 2/2016 | Cao | G06K 9/00268 382/195 |
| 2016/0253549 A1* | 9/2016 | Ramic | G06K 9/00281 382/118 |
| 2017/0308909 A1* | 10/2017 | Faith | G06Q 30/0201 |
| 2017/0351793 A1* | 12/2017 | Tamstorf | G06F 17/5018 |
| 2018/0295704 A1* | 10/2018 | Haverlag | H05B 37/0245 |

* cited by examiner

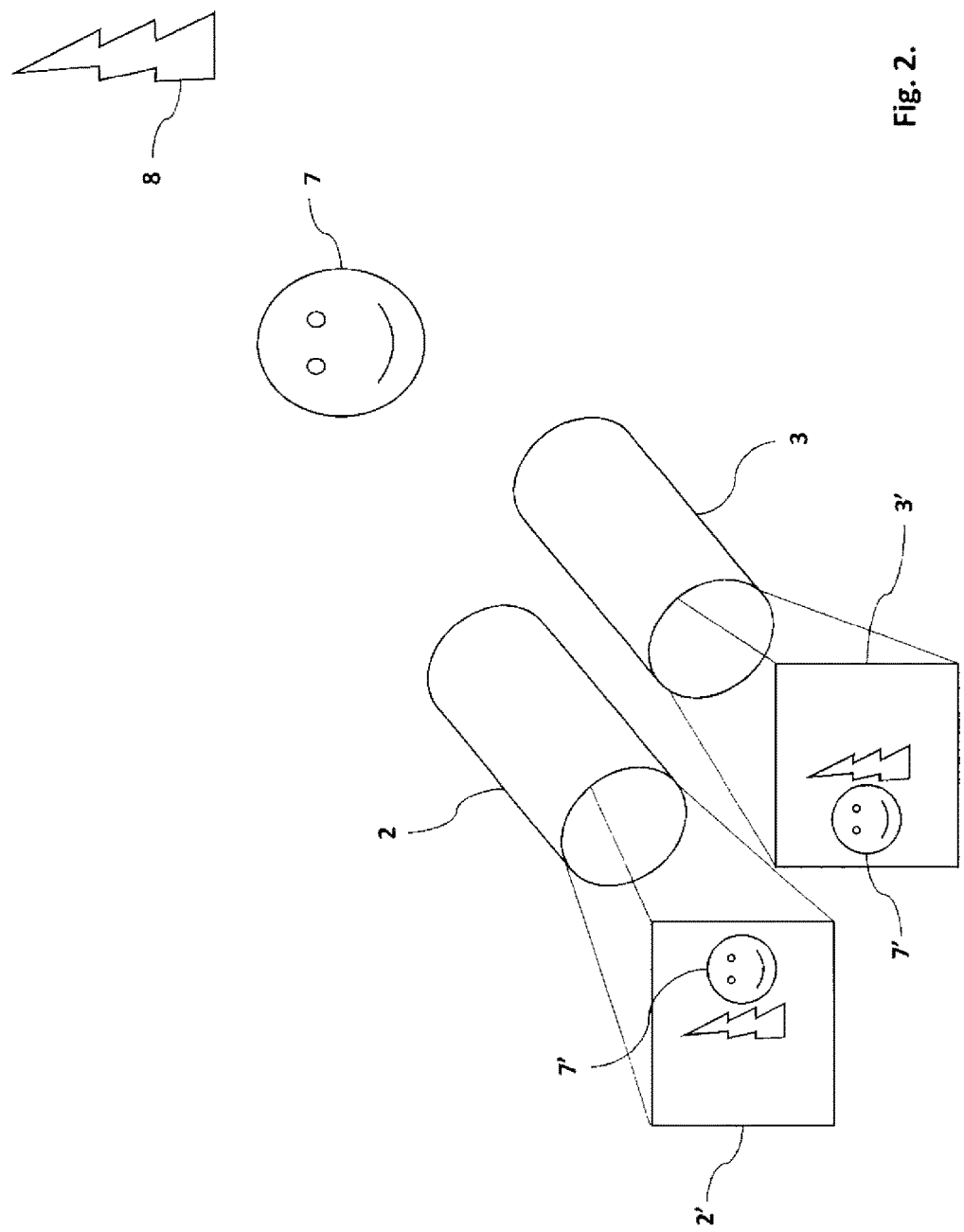

SYSTEM AND METHOD FOR DETERMINING THE AGE OF AN INDIVIDUAL

There are many instances where it is necessary to know the age of a person to determine whether that person is above or below a predetermined allowable age.

Examples of instances where it is necessary to determine the age of someone include: the purchase of age-restricted goods, such as cigarettes, alcohol, pornographic material etc.; access to some forms of entertainment such as gambling; and access to on-line entertainment or on-line purchasing websites. The foregoing list is by way of example only, and the reader should be aware that there are many other instances where it is advantageous or desirable to determine the age of a particular individual.

Conventionally, if the age of an individual needs to be verified in order that the purchase of age-restricted goods or services can be authorised, the individual in question will typically be asked to supply some form of identification to the operator of the point-of-sale terminal. The identification will typically be a driving license, passport or any other suitable documentation that provides some form of evidence as to the age of the particular individual in question.

There are some instances where there is no sales operative at the point-of-sale terminal. This situation occurs when the point-of-sale terminal is a self-checkout device or if the purchase is through a vending machine or other such automated purchase device. Here, it is not possible to check the identification of a prospective customer or patron in a face-to-face manner.

US-A-2004/0153421 describes a system and method for verifying a person's age during a transaction for age-restricted goods or services at an unattended point-of-sale device. The system comprises a network of vending machines and kiosks that are linked to a remote database that contains biometric information of individuals enrolled into the system.

The biometric information held on the database may include a finger print scan, a retinal scan, a facial scan, or a voice print. Enrollees have already provided identity and age verifying documentation upon registration. When an individual wishes to purchase age-restricted goods at a kiosk or vending machine, they provide a biometric sample, a fingerprint for example, which is then checked for a match with the information held on the remotely located database. If the individual's age is at or above the required age verification level, the transaction is authorised.

US-A-2007/0098235 discloses a method of estimating the age range into which the age of an individual falls by scanning the index finger pad of the individual to ascertain the average distance between the epidermal ridges of the finger pad. If the average distance between adjacent epidermal ridges is less than 0.477 mm it is determined that the individual is under the age of 17 years.

In another conventional system, as described in US-A-2009/0230185, age verification of an individual presenting themselves at a cash register and wishing to purchase an age-restricted item is achieved by sending a video-captured image of the individual to a remote age verification centre via a network. A human operator at the age verification centre decides whether the age of the individual is at or above the required age from the received image of the individual. If the operator decides that the individual's age is at or above the required age, an authorisation signal is issued to the cash register at which the individual has present themselves allowing the individual to make a payment for the age-restricted product.

US-A-2015/0199702 discloses a system that is used in conjunction with a shopper loyalty card system. The retail loyalty card system stores information on each customer registered within the scheme. The stored customer information includes a customer identifier and an associated customer photograph. When a customer presents their loyalty card at a point-of-sale terminal, the system identifies the customer by reading the customer identifier from the presented card. The system also captures an image of the customer and compares this image with the image stored for that particular customer. In this way the customer's age and identity can be verified.

Problems arise from the above discussed prior art in that they require either the establishment of a database of user information, they require the intervention of a human operator, or that they require the individual to actively engaged with the system by supplying biometric information in the form of a fingerprint scan etc.

The present invention arose from attempts at addressing some or all of the aforementioned problems associated with the prior art.

According to an aspect of the present invention there is provided a method of determining an individual's age comprising the steps of: obtaining a plurality of images of the individual; locating the face of the individual in each of the plurality of images of the individual; locating facial landmarks of the face of the individual in each of the plurality of images of the individual; mapping the face of the individual in each of the plurality of images of the individual onto a previously determined face shape template such that the position of facial landmarks in each image coincides with corresponding facial landmarks in the previously determined face shape template; cropping each of the plurality of images of the individual to forth a plurality of face region images; comparing each pixel in each face region image with a plurality of nearest neighbour pixels to determine a plurality of image pixel values; creating a plurality of image distributions from the plurality of image pixel values; determining a plurality of age estimation values by applying a linear regression process to each of said plurality of image distributions; and determining the individual's age by averaging said plurality of age estimation values.

Preferably, the method includes monitoring with at least one camera a predefined area for an incursion into said area by an individual. Alternatively, the area is monitored by a pair of cameras adapted to capture images in the near infrared region of the electromagnetic spectrum and a further camera adapted to capture images in the visible region of the electromagnetic spectrum.

Locating the face of the individual in each of the plurality of images of the individual is achieved by utilisation of the Viola-Jones face detection procedure, and the step of locating facial landmarks of the face is accomplished by applying a cascaded random forest decision tree technique to each image of the plurality of images.

Preferably, prior to mapping the face of the individual in each of the plurality of images of the individual onto a previously determined face shape template, each image from the plurality of images of the individual undergoes correction by affine transformation.

Each pixel in each face region image is compared to each of the nearest neighbour pixels and this results in the formation of a local binary pattern from which image pixel values are calculated, and image distributions, preferably histograms, of image pixel values are subsequently created.

Preferably, each image of the individual is cropped to a size of 250×250 pixels.

According to another aspect of the present invention, there is provided an imaging apparatus comprising: a pair of cameras adapted to capture images in the near infrared region of the electromagnetic spectrum; a camera adapted to capture images in the visible region of the electromagnetic spectrum; a near-infrared light source; and a controller.

Preferably, the controller comprises a 32-bit processor and a field-programmable gate array integrated circuit.

An embodiment of the present invention will now be described, by way of example only, with reference to the accompanying schematic drawings, in which:

FIG. 2 illustrates detection of the incursion of a person into the foreground of a surveyed area;

Figure 1:
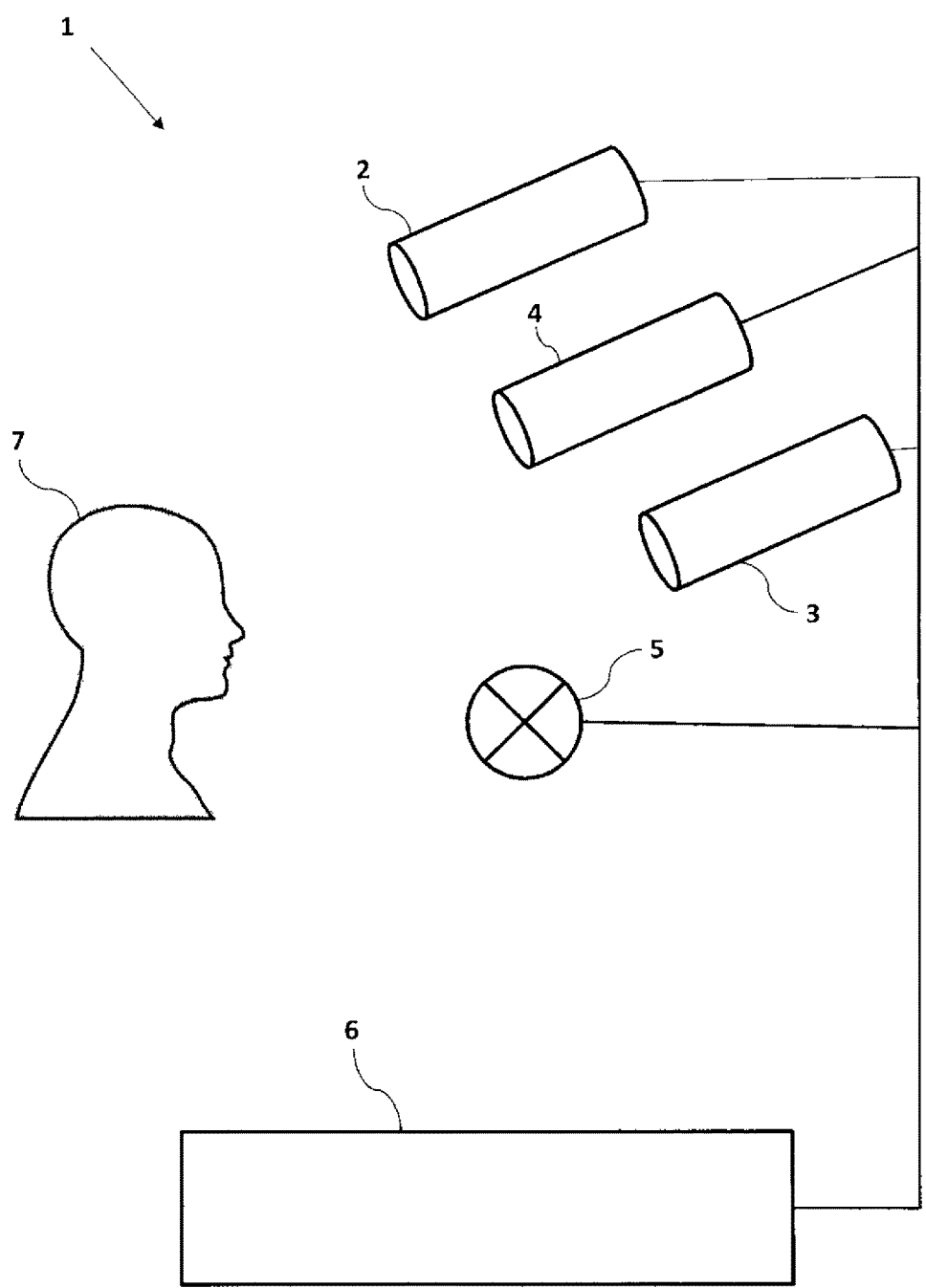
FIG. 1 shows an imaging apparatus of the present invention.

As shown in FIG. 1, the imaging apparatus 1 of the present invention comprises a first infrared camera 2 and a second infrared camera 3. The apparatus also includes an infrared light source 5 for illuminating the face of an individual 7 and an RGB camera 4 for obtaining an image of the individual 7 using light in the visible portion of the electromagnetic spectrum. Here, an RGB camera is taken to mean any camera suitable for imaging in the visible region of the electromagnetic spectrum.

The first and second infrared cameras 2, 3 are positioned and aligned so that a stereoscopic infrared image of an individual 7 entering the proximal viewed space is obtained. In order that a subject individual is adequately illuminated, a near-infrared light source 5 is provided proximal to the cameras 2, 3. Such alight source may be implemented as one or a series of infrared LEDs.

The imaging apparatus includes a controller 6 for managing the operation of the cameras and light source, and for receiving and storing image data received from the cameras.

As shown in FIG. 2, an individual 7 entering the field-of-view of the infrared cameras 2, 3 between a distant object, a tree 8 for example, and the pair of cameras, will result in differing images of the same scene in each camera. The image 2' of the scene in left-hand side camera 2 will show the individual positioned to the right of the distant tree 8, whereas the image 3' of the scene in the right-hand side camera 3 will show the individual positioned to the left of the tree (the difference in the views have been exaggerated for clarity).

Figure 7:
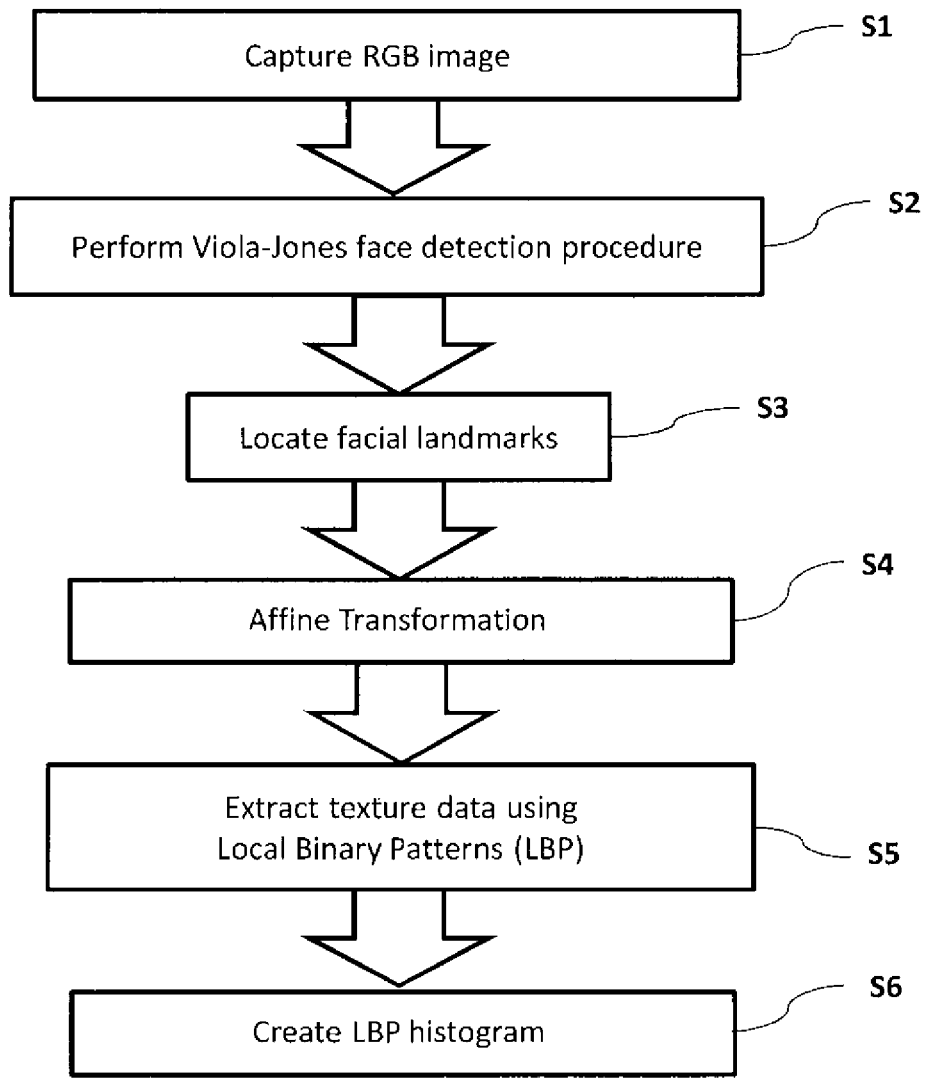
FIG. 7 is a flowchart of steps in the method of the present invention.

With reference to FIG. 7, when the controller 6 receives image data from the pair of infrared cameras 2, 3 indicating that there is a difference between the left and right views of the scene, the controller 6 will instruct the RGB camera 4 capture multiple RGB images of the currently surveyed scene (S1).

As soon as a first RGB image has been captured, the controller 6 initiates a face detection procedure within the captured image (S2). Preferably, the controller 6 implements a Viola-Jones face detection algorithm on the captured image data. Although the Viola-Jones approach is the preferred method of face detection, it should purpose may be applied.

At step 3 (S3) the controller 6 initiates a procedure for locating facial landmarks within the image data of the face detected at step 2 (S2).

The preferred implementation for step 3 (S3) is execution of an algorithm by the controller 6 based upon an ensemble of regression trees on pixel intensity data. For further information in relation to this technique the reader is directed to the Open Access version of CVPR2014 paper entitled "*One millisecond face alignment with an ensemble of regression trees*" by Vahid Kazemi and Josephine Sullivan.

At step 4 (S4) image data is corrected, if necessary, by application of affine transformations. Typically, this will involve simple alignment of the image by iterative translations and/or rotations of the image such that the detected face image is mapped onto a previously determined face shape template 9.

Figure 3C:
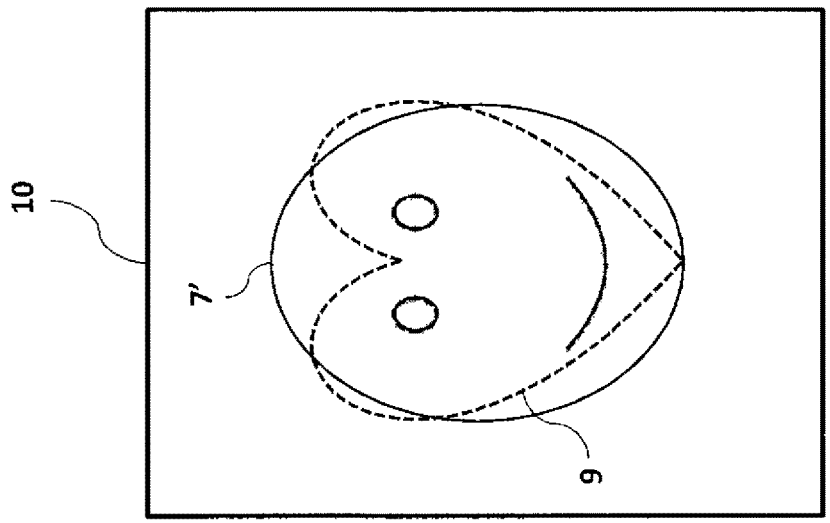
FIGS. 3A to 3C illustrate the process of image template mapping according to the present invention.
Figure 3B:
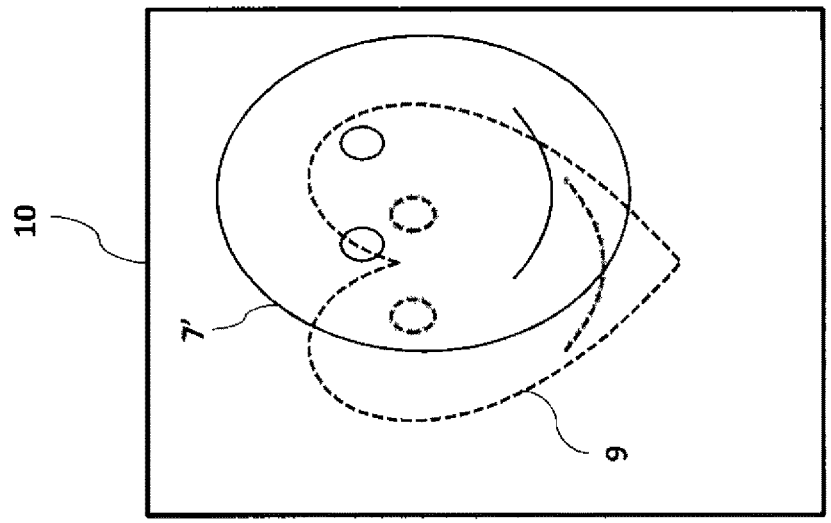
Figure 3A:
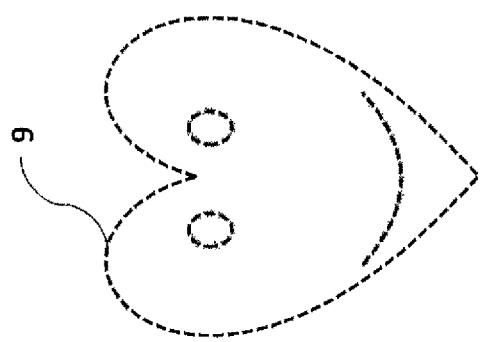

As shown in FIGS. 3A to 3C, a face shape template 9 is positioned centrally within a face region 10 of the acquired RGB image. The template 9 is constructed from the analysis of face shapes from numerous training images of people's faces. The face shape template 9 will typically be an 'average' face shape that represents a 'best fit' for each different face shape of numerous training face shapes. The process of transforming the acquired image of the face onto the template 9 can be implemented by application of any morphing technique known in the art.

Next, at step 5 (S5), a texture operation is applied to the image data to form a local binary pattern (LBP).

Figure 4:
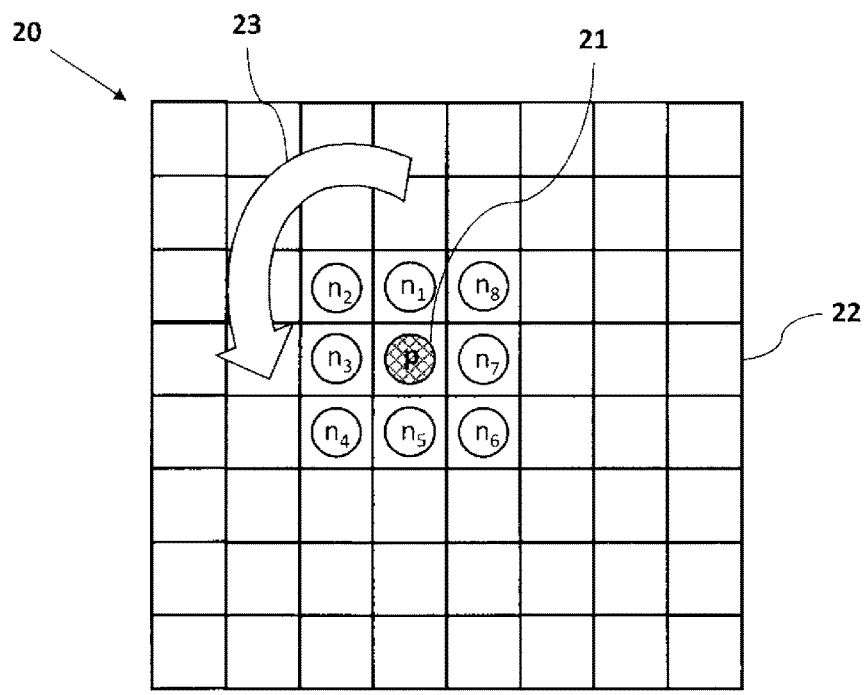
FIG. 4 shows a detail of an image pixel surrounded by eight nearest neighbour image pixels.

FIG. 4 illustrates the process by why the controller 6 builds up an LBP 20 of the pixel data in the acquired image of the face 7'.

For each pixel 21 in a chosen image pixel grid 22 the neighbouring eight pixels surrounding the chosen pixel p is labelled $n_1$ to $n_8$ in a clockwise manner 23. In the example shown this is an 8×8 pixel grid 22, but this is an arbitrary choice and, in practice, this grid can be of any desired size.

For each pixel $n_1$ to $n_8$ a comparison is made between the grey scale intensity of pixel p with pixel n. For i=1 to 8, the value $n_i$=1 if p is darker pixel than pixel $n_i$, otherwise $n_i$=0. Consequently, for each pixel p in the grid 22 a binary value N is assigned, where N=$n_1 n_2 n_3 n_4 n_5 n_6 n_7 n_8$.

For example, the value N for pixel p 21 might be calculated as 10010110. This binary number is then converted to the decimal number 150, and pixel 21 is assigned this value. For each pixel p within the grid a value N is determined, where 0≤N≤255.

Figure 5:
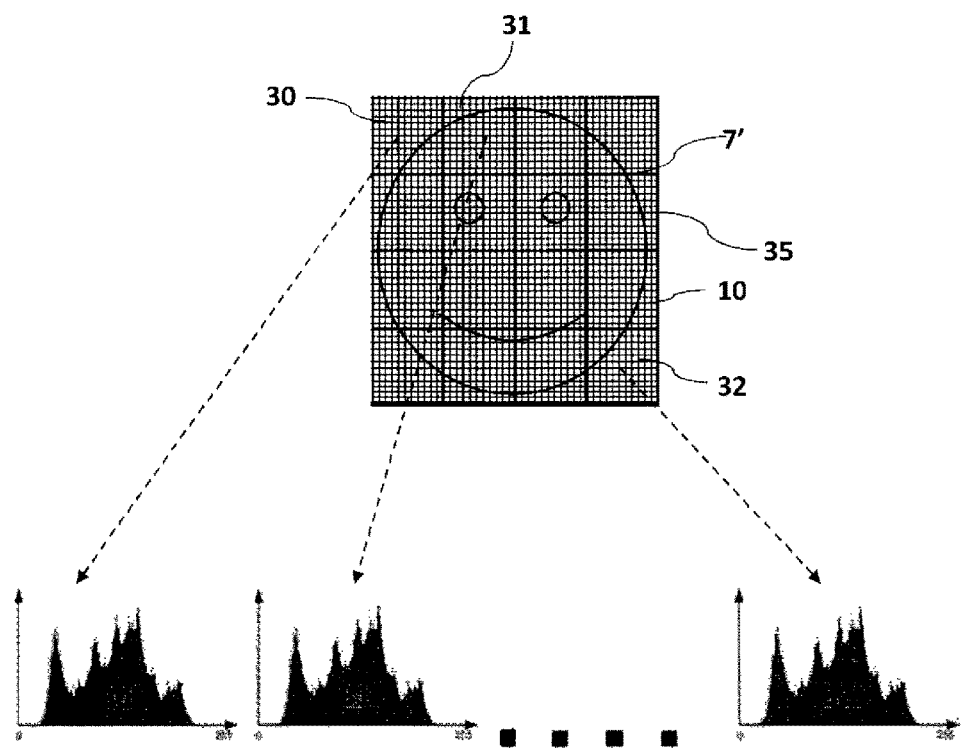
FIG. 5 shows the relationship between an image grid and a succession of image pixel value histograms.

With reference to FIG. 5, for each grid 30, 31, 32 etc, a respective histogram 30', 31', 32' is constructed with $2^8$ labels [step 6 (S6) in FIG. 7]. So, for the example shown in FIG. 5 controller 6 constructs 16 separate histograms, i.e. step 6 (S6) is repeated sixteen times.

The 16 separate histograms are then concatenated to form a single, larger histogram that represents the distribution for the entire face region image 10.

Next, linear regression is applied to the distribution for the entire face region 10 from which an age estimation is computed for the person whose face image 7' appears in the face region image 10. This age estimation is based upon linear regression coefficients that have been previously calculated and stored in the system memory.

The stored regression coefficients are created during a training phase where images are captured of people's faces whose ages are known. Once multiple images of people have been obtained over a large age range (say 16 years to 70 years, for example), LBP histograms are constructed from which respective regression coefficients are determined using a least-squares method.

With the stored coefficients an age estimation can be determined from the following equation:

$$Age = \sum_{k=1}^{n} \beta_k \times X_k$$

Where β represents the stored regression coefficient, X is the corresponding distribution value in the LBP histogram, and n is the total number of pixels comprising the LBP.

As mentioned above, the controller 6 instructs the RGB camera 4 to take multiple images of the scene and, for each captured image, the above process is repeated simultaneously. From this a plurality of age estimations for the individual are calculated, each estimation obtained from a separate image of the same individual.

Finally, the controller 6 determines the age of the person captured in the images by calculating the average age from the multiple age estimations.

Figure 6:
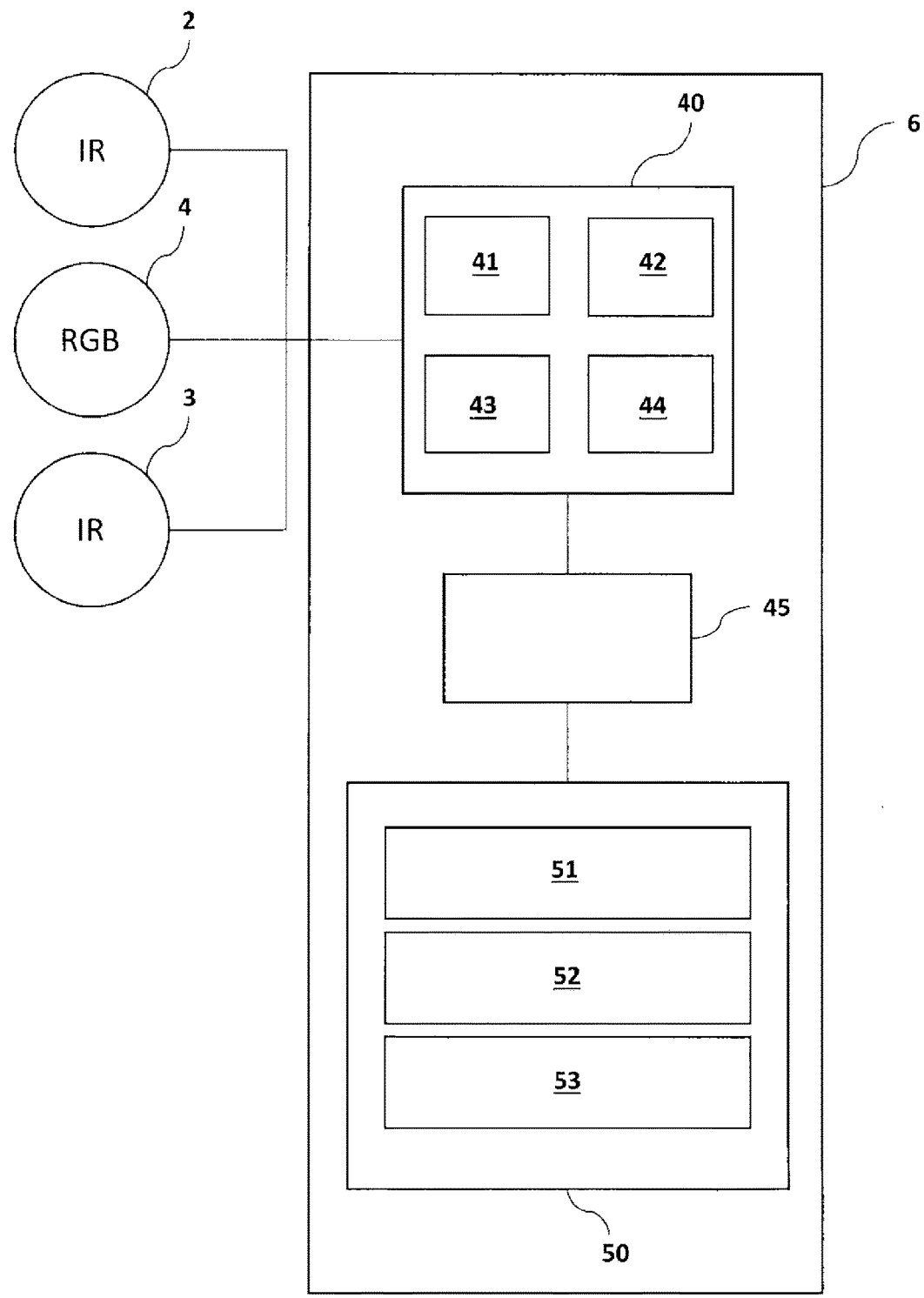
FIG. 6 shows an imaging apparatus controller.

With reference to FIG. 6, the controller 6 comprises and FPGA 40, a 32-bit processor 50, and a memory device 45.

The FPGA 40 interfaces with and controls operation of both the IR cameras 2, 3 and the RGB camera 4.

The FPGA includes an image enhancement unit 41, an IR image rectifier unit 42, a local binary pattern (LBP) unit 43, and a 3D-mapping unit 44. The LBP unit 43 executes a texture extraction algorithm from which the histograms discussed above are created.

The 32-bit processor comprises a face detection unit 51, a facial landmark locating unit 52, and a regression unit 53. The face detection unit 51 executes a Viola-Jones detection algorithm, and the facial landmark locating unit is configured to compute the cascaded random decision tree forest as discussed in the prior art cited above.

The regression unit 53 handles the linear regression function of the controller 6 and computes the average age from the distributions produced by the LBP unit 43.

The invention claimed is:

1. A method of estimating an individual's age comprising the steps of:
   obtaining a plurality of images of the individual;
   locating a face of the individual in each of the plurality of images of the individual;
   locating facial landmarks of the face of the individual in each of the plurality of images of the individual;
   mapping the face of the individual in each of the plurality of images of the individual onto a previously determined face shape template such that a position of facial landmarks in each image coincides with corresponding facial landmarks in the previously determined face shape template;
   cropping each of the plurality of images of the individual to form a plurality of face region images;
   comparing each pixel in each face region image with a plurality of nearest neighbour pixels to determine a plurality of image pixel values, wherein the comparing of each pixel includes comparing a grey scale intensity of each pixel with a grey scale intensity of one or more neighbouring pixels immediately adjacent that pixel, and assigning values to one or more of the immediately neighbouring pixels, wherein the value assigned to a neighbouring pixel is a 1 if the grey scale intensity of the that pixel is darker than the neighbouring pixel, and a 0 otherwise;
   creating a plurality of image distributions from the plurality of image pixel values;
   determining a plurality of age estimation values by applying a linear regression process to each of said plurality of image distributions; and
   determining the individual's age by averaging said plurality of age estimation values.

2. A method as claimed in claim 1, wherein the method includes monitoring with at least one camera a predefined area for an incursion into said area by an individual.

3. A method as claimed in claim 2, wherein the area is monitored by a pair of cameras adapted to capture images in the near infrared region of the electromagnetic spectrum and a further camera adapted to capture images in the visible region of the electromagnetic spectrum.

4. A method as claimed in claim 1, wherein the step of locating the face of the individual in each of the plurality of images of the individual comprises the application of the Viola-Jones face detection procedure.

5. A method as claimed in claim 1, wherein the step of locating facial landmarks of the face of the individual in each of the plurality of images of the individual comprises the application of a cascaded random forest decision tree technique to each image of the plurality of images.

6. A method as claimed in claim 1, wherein prior to mapping the face of the individual in each of the plurality of images of the individual onto a previously determined face shape template, each image from the plurality of images of the individual undergoes correction by affine transformation.

7. A method as claimed in claim 1, wherein the image distributions are histograms of image pixel values.

8. A method as claimed in claim 1, wherein the plurality of images of the individual are cropped to a size of 250×250 pixels.

9. A method as claimed in claim 1, wherein each age estimation value is given by:

$$Age = \sum_{k=1}^{n} \beta_k \times X_k.$$

10. An imaging apparatus comprising:
    a pair of near-infrared cameras adapted to capture images in a near infrared region of a electromagnetic spectrum;
    a visible light camera adapted to capture images in a visible region of the electromagnetic spectrum;
    a near-infrared light source; and
    a controller coupled to the near-infrared and visible light cameras, the controller configured to:
    a.) control the near-infrared and visible light cameras to obtain a plurality of images of an individual;
    b.) apply an image transform to an image of the plurality of images to transform the image so that a portion of the image is transformed to coincide with a previously determined face shape template, wherein in a position of facial landmarks in the image coincide with corresponding facial landmarks in the previously determined face shape template;
    c.) compare each pixel of the image with a plurality of nearest neighbouring pixels to determine a plurality of local binary patterns for each pixel of the nearest neighbouring pixels, wherein determining a local binary pattern includes:

comparing a grey scale intensity of each pixel with a grey scale intensity of one or more neighbouring pixels immediately adjacent that pixel;

assigning values to one or more of the immediately neighbouring pixels, wherein the value assigned to a neighbouring pixel is a 1 if the grey scale intensity of the that pixel is darker than the neighbouring pixel, and a 0 otherwise;

d.) create at least one image distribution using the plurality of local binary patterns;

e.) apply a linear regression process to the at least one image distribution; and f.) determine an age estimation value for the individual by comparing the results of the linear regression to one or more previously calculated linear regression values associated with previously captured images of individuals.

11. An imaging apparatus as claimed in claim 10, wherein the controller comprises a 32-bit processor and a field-programmable gate array integrated circuit.

12. The imaging apparatus of claim 10, wherein the resulting local binary pattern for each pixel is converted to a separate binary number associated with each respective pixel of the neighbouring pixels.

13. The imaging apparatus of claim 10, wherein the controller is further configured to:

locate a face region of the image that includes a face of the individual.

14. The imaging apparatus of claim 13, wherein the controller is further configured to:

crop the image to eliminate other portions of the image outside the face region.

15. The imaging apparatus of claim 13, wherein the controller is further configured to:

locate facial landmarks of a face of the individual in the face region of the image.

16. The imaging apparatus of claim 10, wherein the controller is further configured to:

g). determine a plurality of age estimation values by repeating steps d), e), and f) for each of the plurality of local binary patterns.

17. The imaging apparatus of claim 16, wherein the controller is further configured to:

h). determine the individual's age by averaging the plurality of age estimation values.

18. The imaging apparatus of claim 17, wherein the controller is configured to first repeat steps b), c), d), e), f), and g) for each of the plurality of images of an individual before performing step h).

* * * * *